United States Patent
Takami et al.

(10) Patent No.: US 6,452,651 B1
(45) Date of Patent: Sep. 17, 2002

(54) LIQUID CRYSTAL DISPLAY AND METHOD FOR PRODUCING THE SAME

(75) Inventors: Manabu Takami; Masaki Kitaoka; Ayumi Sasaki; Tomio Wada, all of Fukushima (JP)

(73) Assignee: Nanox Corporation, Fukushima-ken (JP)

( * ) Notice: Subject to any disclaimer, the term of this patent is extended or adjusted under 35 U.S.C. 154(b) by 106 days.

(21) Appl. No.: 09/662,419

(22) Filed: Sep. 14, 2000

(30) Foreign Application Priority Data

Sep. 27, 1999 (JP) .......................................... 11-272753

(51) Int. Cl.$^7$ ............................................ G02F 1/1325
(52) U.S. Cl. ............................................ 349/88; 349/86
(58) Field of Search ..................................... 349/86, 88

(56) References Cited

U.S. PATENT DOCUMENTS

| | | | |
|---|---|---|---|
| 5,437,811 A | | 8/1995 | Doane et al. .......... 252/299.01 |
| 5,490,001 A | * | 2/1996 | Konuma ...................... 349/86 |
| 5,636,043 A | * | 6/1997 | Uemura et al. ............... 349/86 |
| 5,847,798 A | * | 12/1998 | Yang et al. .................... 349/88 |
| 5,940,156 A | * | 8/1999 | Nishiguchi et al. ........... 349/86 |
| 6,061,107 A | * | 5/2000 | Yang et al. .................... 349/86 |
| 6,313,894 B1 | * | 11/2001 | Sekine et al. ................. 349/86 |
| 6,331,881 B1 | * | 12/2001 | Hatano et al. ................ 349/86 |

OTHER PUBLICATIONS

"Materials for Polymer–Stabilized Liquid Crystals", L.C. Chien, et al, Kent State University 1996, Chapter 11, pp. 182–189, American Chemical Society.

* cited by examiner

Primary Examiner—James Dudek
(74) Attorney, Agent, or Firm—Dike Bronstein, Roberts & Cushman IP Group Edwards & Angell, LLP; David G. Conlin; David A. Tucker

(57) ABSTRACT

The invention provides a liquid crystal display having high reliability, which is excellent in terms of optical characteristics, heat resistance, and shock resistance, wherein a liquid crystal display consisting of a cholesteric liquid crystal, a chiral nematic liquid crystal or a liquid crystal 1 layer, being a combination thereof, which is roughly pillar-like and polygonal in section or has a roughly pillar-like form enclosed by a closed curve, and divided by said polymer network into areas whose minimum diameter measured by vernier calipers is 5 $\mu$m and whose maximum diameter measured by vernier calipers is 100 $\mu$m, is obtained by polymer networks 4 formed by polymerization of monomer, so that sufficient reflection can be obtained from the liquid crystal 1 without being optical scattering. Although the perpendicular array of the helical axes of liquid crystal 1 is slightly disordered by a polymer network 4 with respect to the plane of a pair of ITO 2a, 2b and substrates 3a,3b, wherein since almost all light entering from the substrata 3a side is reflected backwards (substrate 3a side) by Bragg's reflection, it is possible to decrease the visual angle dependency in comparison with a prior art liquid crystal display not containing any polymer constituents, and networks 4 which have been greatly established form intensive pillars (macromolcular resin walls), thereby improving the shock resistance properties.

5 Claims, 5 Drawing Sheets (a)

50 μm (b)

50 μm (a)　　　　　　　　(c)

(b)　　　　　　　　(d)

LIQUID CRYSTAL DISPLAY AND METHOD FOR PRODUCING THE SAME

TECHNICAL FIELD OF INVENTION

The present invention relates to a liquid crystal display having a network structure, the display being made of a cholesteric liquid crystal layer, a chiral nematic liquid crystal layer, or a liquid crystal layer, being a combination thereof.

PRIOR ARTS

As shown in FIG. 5, a planar array structured liquid crystal display is a liquid crystal display having chiral nematic liquid crystal 1 having a cholesteric layer retained between a pair of ITO 2a and 2b and substrates 3a and 3b, in which the helical axes of liquid crystal particles are regularly disposed perpendicular to the plane of the substrates 2a and 2b. The liquid crystal display meets the Bragg's reflection conditions, in which light entering from one substrate 3a side is reflected onto the rear side (substrate 3a side). At this time, it has been publicly known that if the helical axes of the planar array are excessively aligned, the visual angle dependency (a characteristic by which wavelengths of the Bragg's reflection light change according to the angle of looking at the reflection light) is increased.

Also, if the perpendicular array property with respect to the planes of the substrates 3a and 3b of the helical axes of the planar array is disordered, and becomes a focal conic array in which the helical axes of the liquid crystal 1 are arrayed in an irregular direction or almost parallel to the surface of the substrates 3a and 3b, light entering from one substrate 3a side is reflected frontward, passing through the other substrate 3b, after it is subjected to Bragg's reflection on the helical plane of liquid crystal. In addition, in the respective liquid crystal in which the perpendicular array property with the substrate plane of the helical axes is disordered, the angles that causes the incident light to be subjected to Bragg's reflection by the liquid crystal array differ, wherein the wavelength dependency of the reflective index is eliminated, and the reflected light seems to be whitened, although depending on the positions of observation of the reflected light.

In PDLC (Polymer Dispersed Liquid Crystal) or PNLCD (Polymer Network Liquid Crystal Display) which is a liquid crystal display in which normal nematic liquid crystal is capsulated and dispersed in a macromolecular resin, an optical scattering mechanism that is brought about by mismatching of the refractive indexes between the liquid crystal and macromolecular resin. Therefore, almost all light entering from one substrate 3a side is scattered in the liquid crystal layer, and thereafter it passes through the other substrate 3b and is moved frontward. Therefore, it is difficult to achieve a reflection display having a sufficient brightness.

Contrary to this, since, in the cholesteric liquid crystal or chiral nematic liquid crystal, light entering from one substrate 3a side is subjected to reflection, the quantity of light reflected onto the rear side of the corresponding one substrate 3a side becomes sufficient.

However, since the visual angle dependency is high, resulting from the Bragg's reflection, chromatic changes or glare occurs by changing the visual angle. To eliminate these faults, as shown in FIG. 6, a slight amount of monomer is doped to liquid crystal and polymerized to make a polymer network 4 for the purpose of scattering the perpendicular array property of liquid crystal 1 with respect to the planes of a pair of ITO 2a and 2b and substrates 3a and 3b of the helical (spiral) axes. This has been reported in the literatures ((1) Tokuhyo H7-507083, (2) "Materials for Polymer-Stabilized LiquidCrystal" L.-C. Chien, etc., Kent State University, 1996, Chapter 11, P.182–P.189, American Chemical Society), etc.

SUMMARY OF THE INVENTION

Since very minute polymer networks 4 are three-dimensionally formed of a monomer such as BMBB6 (4,4'-bis{4-[6-(methacryloyloxy)-hexyloxy]benzoate}-1,1'-biphenylene), etc., proposed by Kent, et al., the whiteness of the reflection light is increased, and glare may be eliminated. But, sufficient reflection light can not be obtained.

Also, although not being limited to the invention made by Kent et al., in a liquid crystal display of a network structure in which liquid crystal is dispersed in macromolecular resin produced by prior arts, since the size of the network is small, sufficient reflection can not be obtained from the planar texture, wherein light is scattered frontward (the substrate 3b side) due to the polymer network which becomes the domain boundary, and the reflective index may be worsened.

Also, as a liquid crystal display obtained by the method of dispersing a small amount of macromolecular resin in the chiral nematic liquid crystal, PSCT (Polymer Stabilized Cholesteric Texture) has been already known, which becomes a transparent body of homeotropic structure when voltage is applied, and a reflection body of planar structure or a scattered transparent body of slight focal conic structure due to a switch-off wavelength of voltage when no voltage is applied. The quantity of monomer doped on the PSCT is approx. 3%, which forms minute networks of a size of 1 micron. Since the size of the networks is very minute, the shock resistant property is inferior, wherein the networks may be easily deformed due to external forces to cause the internal liquid crystal texture to be deformed. That is, such a problem arises, where if the surface of the liquid crystal panel is pressed by a finger, the display may disappear.

Although a liquid crystal display provided with a touch panel is available, the abovementioned PSCT cannot be used for this type of use. In order to improve the shock resistant property of the PSCT, it is publicly known that doping of a greater quantity of monomer is effective. But, if 10% or more monomer is doped in, for example, the PSCT made by Kent, et al., cases where light is scattered in the polymer networks are increased, the reflective index is comparatively decreased, and light scattering at the focal conic portion is increased, whereby the contrast of the liquid crystal display is worsened.

Also, although the monomer doped in liquid crystal is polymerized by radiation rays such as ultraviolet rays or heat, and polymer networks are formed, the surface area which is brought into contact with the liquid crystal is increased because the polymer networks are very minute, whereby non-reacted monomer contained in the polymer is easily eluted into the liquid crystal.

It is therefore an object of the invention to provide a liquid crystal display which has excellent reliability in terms of optical characteristics and shock-resistance properties.

DISCLOSURE OF THE INVENTION

The inventor, et al., invented a liquid crystal display having a liquid crystal layer formed between two conductive substrates, at least one of which is transparent, in which it is optimal that networks are formed by polymer formed by polymerization of monomer so that sufficient reflection can be secured in a cholesteric liquid crystal, chiral nematic liquid crystal or liquid crystal, being a combination thereof without scattering incident light, and a cholesteric liquid crystal, chiral nematic liquid crystal or a liquid crystal layer, being a combination thereof is formed, which is roughly pillar-like and polygonal in section or has a roughly pillar-like form enclosed by a closed curve, divided by said polymer network into areas whose minimum diameter measured by vernier calipers is 5 $\mu$m and whose maximum diameter measured by vernier calipers is 100 $\mu$m.

In a case where the diameter measured by vernier calipers of liquid crystal layer is less than 5 $\mu$m, there increase cases where light is scattered due to the networks, whereby the reflective index of the liquid crystal display is lowered, and the display surface thereof becomes dark. On the other hand, if the diameter measured by vernier calipers of the liquid crystal layer exceeds 100 $\mu$m, the helical axes of the cholesteric liquid crystal are excessively aligned, and reflection of light in a specified direction is intensified, whereby glare like on a mirror surface is produced, and the reflection wavelength may change due to Bragg's reflection, depending on the angle of looking at the display surface. That is, visual angle dependency may arise.

In the invention, by forming comparatively large polymer networks (domains), both sufficient light reflection of the liquid crystal layer and randomness of the helical axis orientation property can be secured, whereby the visual angle can be widened, and it is possible to obtain a liquid crystal display which can suppress the chromatic changes inherent to the Bragg's reflection according to the visual angle. Also, since a liquid crystal layer divided into comparatively large areas in which the minimum diameter measured by vernier calipers is 5 $\mu$m and the maximum diameter thereof is 10 $\mu$m occupies 90% or more of the entire liquid crystal layer, it was possible, even though monomer exceeding 20% by weight is doped, to prevent the light reflection from being lowered at the planar portion of liquid crystal and the scattering in the focal conic portion from being increased. Further, networks formed to be large form intensive pillars (macromolecular resin walls), whereby the shock resistance properties thereof can be remarkably increased in comparison with the liquid crystal display illustrated in FIG. 5 and FIG. 6.

Figure 2:
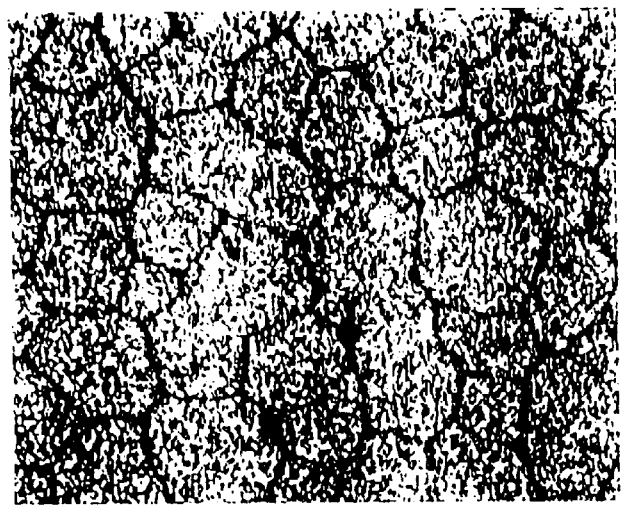
FIG. 2 is a view showing optical microscopic photographs of a liquid crystal display having polymer networks of PSCT according to an embodiment of the invention.
Figure 2:
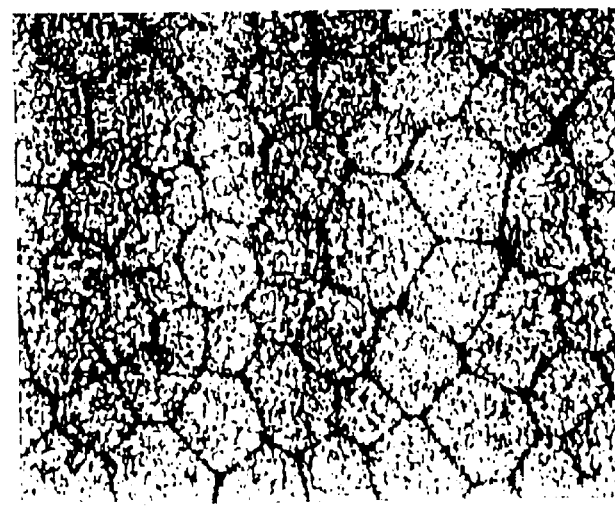
Figure 7:
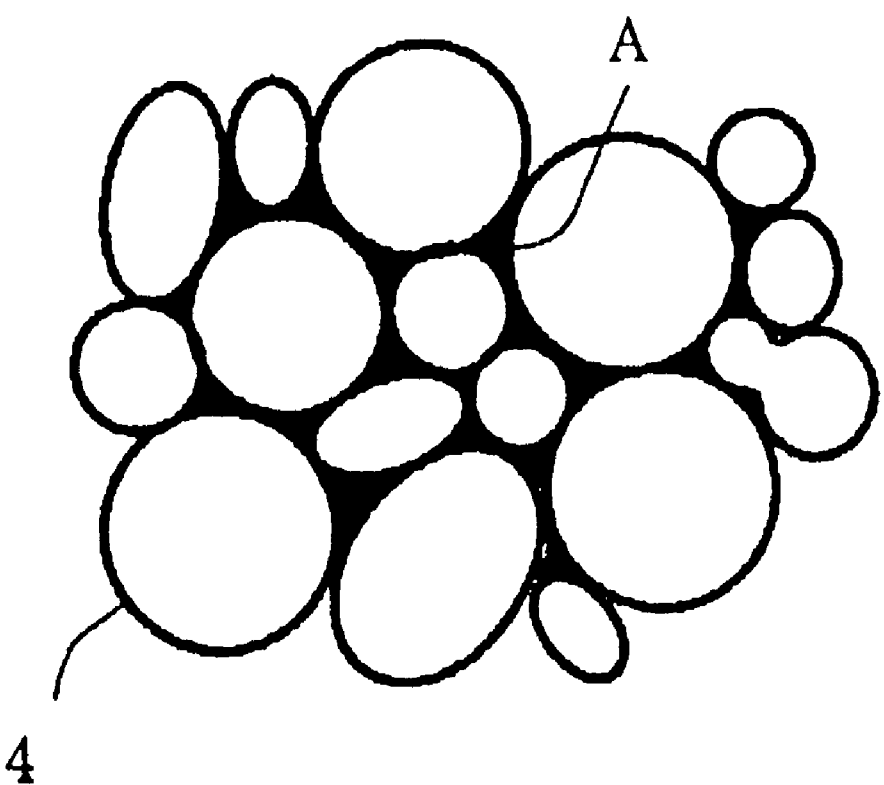
FIG. 7 is an exemplary view showing the sections of a liquid crystal display surrounded by polymer networks whose section is circular.

The sectional shape of liquid crystal, according to the invention, which is enclosed by polymer networks, may be of any one of a polygon or a closed curve. A polygon is further preferred. The reason is because, if the sectional shape of the liquid crystal is formed to be circular, elliptical or a closed curve like a gourd-shaped 8 letter, the thickness (wall thickness) of the networks 4 dividing the liquid crystal is increased at an area A where the liquid crystal is divided into three or more sections. That is, the section of the polymer networks 4 is not formed by only a thin linear wall, wherein many networks having a spot-like or lump-like area A which occupies a certain sectional area are formed. In this case, a portion (which may become a dead corner with respect to display) of polymer networks occupied per unit sectional area of a liquid crystal display is increased, whereby the ratio of liquid crystal portion effectively acting for display is lowered, and the quality of the display may be lowered. contrary to this, if the majority of liquid crystal surrounded by polymer networks 4 formed of walls of roughly uniform thickness is polygonal in section, as shown in FIG. 2, the polymer networks 4 are constructed of thin resin walls even at the portion A shown in FIG. 7, and it is possible to prevent the area of the portion, which does not contribute to display, from becoming larger.

Figure 1:
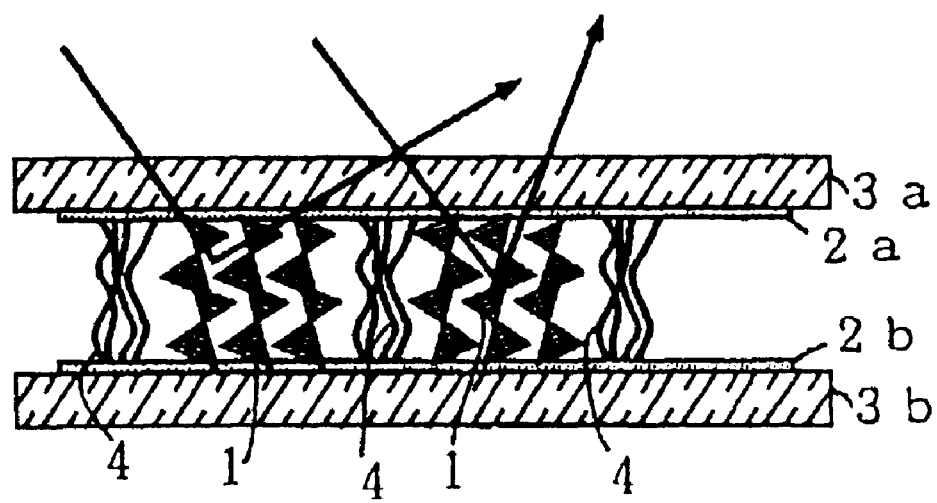
FIG. 1 is a view of simulated orientation of a liquid crystal display having polymer networks of PSCT according to the invention.

FIG. 1 shows a simulated orientation diagram of liquid crystal display in which networks according to the invention are formed. By the perpendicular array property with respect to the planes of a pair of ITO 2a and 2b and substrates 3a and 3b being slightly disordered by the polymer networks 4 at helical axes (spiral) of liquid crystal 1, it is possible to decrease the visual angle dependency in comparison with the liquid crystal display having no polymer constituent shown in FIG. 5. Also, since, with such a degree of disorder in the perpendicular array property of the helical axes, almost all light entering from the substrate 3a side is reflected rearward (substrate 3a side) by Bragg's reflection. Therefore, it is possible to increase the reflective index in comparison with a liquid crystal display of minute networks shown in FIG. 6.

FIG. 2(a) and FIG. 2(b) show optical microscopic photographs of a liquid crystal display in which networks according to the invention are formed. The plane shape of the networks may be of a polygon or of a rounded by a closed curve as shown in the draw s. The shape does not matter.

Figure 3:
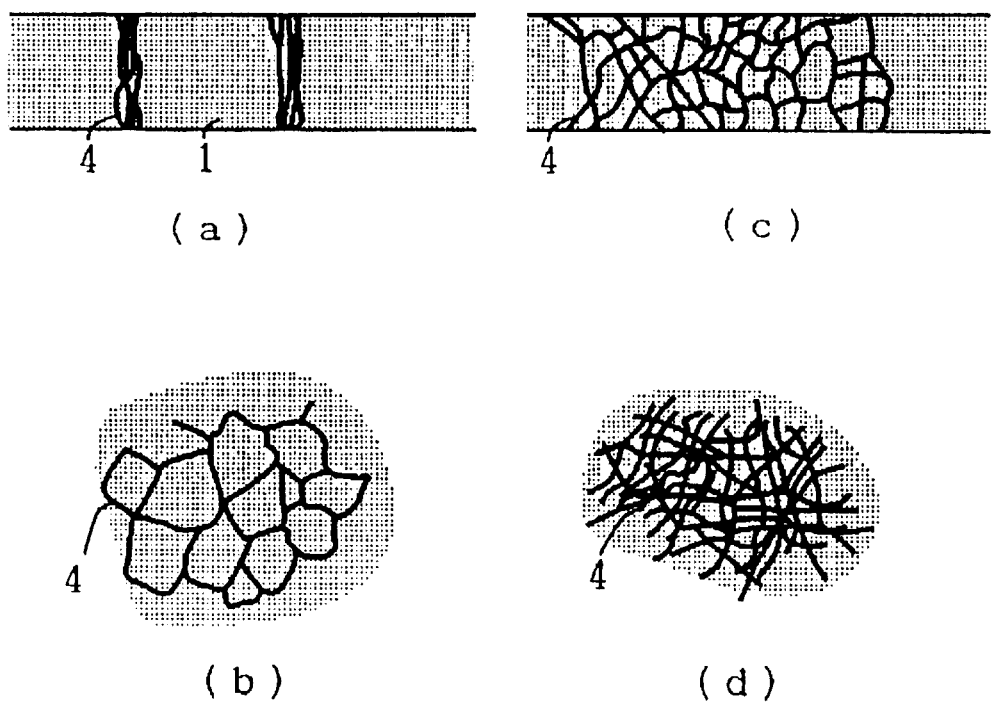
FIGS. 3(a) through 3(d) are views of simulated orientation of a liquid crystal display having polymer networks of PSCT according to the invention and a prior art.

FIG. 3 shows a comparison, wherein an exemplary view (FIG. 3(a)) showing a liquid crystal display, in which networks according to the invention are formed, observed in the sectional direction, and its plan view (FIG. 3(b)) are compared with a sectional view (FIG. 3(c)) of a liquid crystal display, in which networks according to a prior art are formed, and its plan view (FIG. 3(d)). Compared to that the networks 4 according to the prior art are of a three-dimensionally meshed structure, the section of the networks 4 according to the invention is pillar-like.

Figure 4:
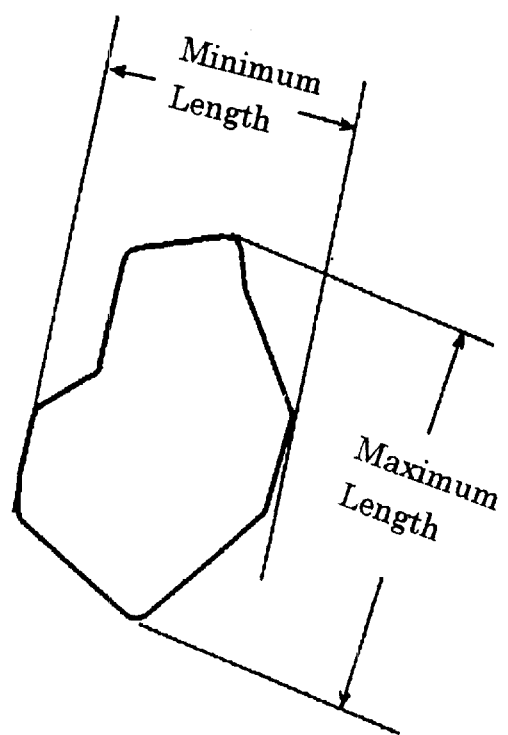
FIG. 4 is a view explaining the size of polymer networks of the PSCT according to the invention.

Also, in the invention, when measuring the diameter of sections of a liquid crystal layer, using vernier calipers, the minimum diameter measured by vernier calipers of a liquid crystal layer means the diameter at which the vernier calipers are provided with the minimum width as shown in FIG. 4, and the maximum diameter measured by vernier calipers means the diameter at which the vernier calipers are provided with the maximum width as shown in FIG. 4.

In the invention, by increasing the size of networks formed by polymer, the contact area between liquid crystal and the polymer can be decreased in comparison with liquid crystal optical elements of a small network size described in the prior arts. Accordingly, non-reacted monomer in the polymer is not eluted in liquid crystal, and the reliability regarding the display performance can be improved.

As liquid crystal used in the invention, Schiff liquid crystal expressed by general formula (1), azoxy-based liquid crystal expressed by general formula (2), cyanobiphenyl-based liquid crystal expressed by generation formula (3), cyanophenylester-based liquid crystal expressed by general formula (4), benzoic acid phenylester-based liquid crystal expressed by generation formula (5), cyclohexane carbonate phenylester based liquid crystal expressed by general formula (6), cyanophenyl cyclohexane based liquid crystal expressed by general formulas (7) and (8), pyrimidine-based liquid crystal expressed by general formulas (9) and (10), phenyldioxane-based liquid crystal expressed by general formula (11), tran-based liquid crystal expressed by general formula (12), and akenylcyclohexane benzonitrile based liquid crystal expressed by general formulas (13), (14) and (15), etc., may be listed.

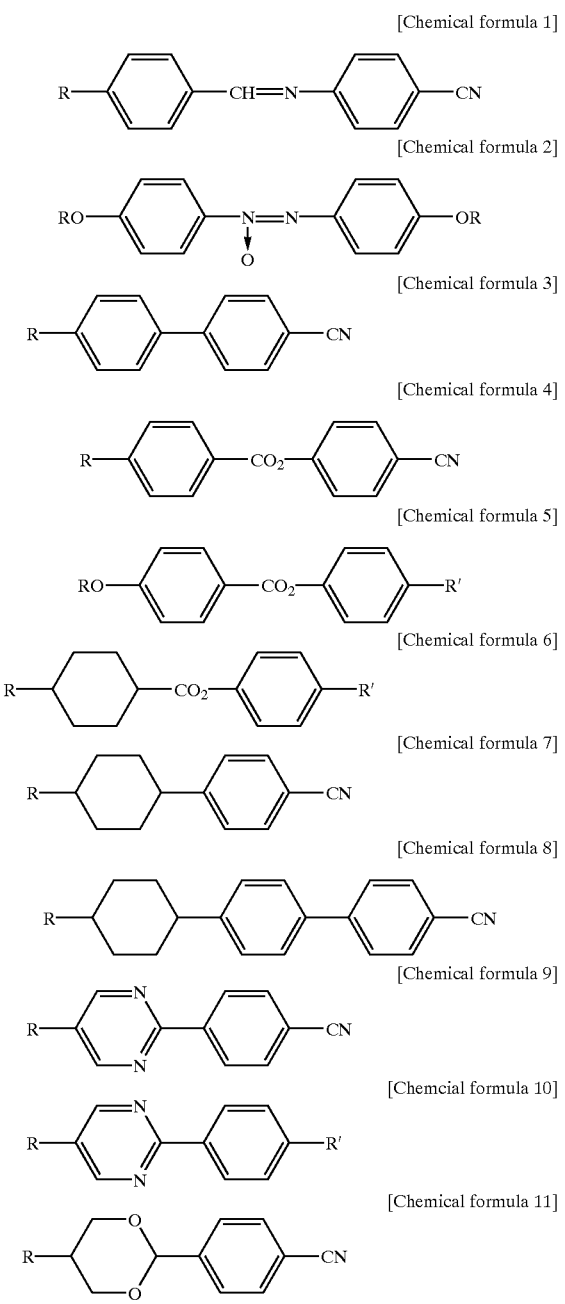

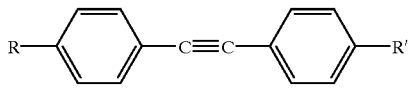

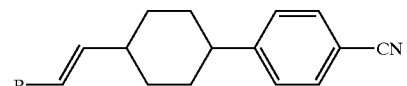

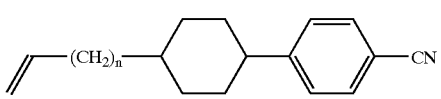

However, n is an integral number 0 or 1,2,3, . . . , R is an alkyl group, phenyl group, or cyclohexyl group, and R' is an alkyl group, cyano group, or alkoxy group.

As detailed liquid crystal materials, for example, 4-substitution 4'-substitution phenylester, 4-(4-substitution cyclohexyl) benzoic acid 4'-substitution cyclohexylester, 4-substitution 4'-substitution biphenyl, 4-substitution phenyl 4'-substitution cyclohexane, 4-substitution 4'-substitution tarphenyl, 4-substitution biphenyl 4'-substitution cyclohexane, 4-substitution cyclohexane carboxlyic acid 4'-substitution biphenylester, 2-(4-substitution phenyl)-5-substitution pyrimidine, cholesterol derivatives, etc., may be listed.

The invention is also featured in that, as a monomer used in the invention, a chemical compound, which is soluble with liquid crystal by heating although having inferior solubility with liquid crystal at a normal temperature, is used. For example, styrene, acrylic acid, acrylate ester, acrylate amide, methacryl acid, methacrylate ester, methacrylate amide, and their derivatives, and vinyl, etc., such as N-vinyl pyrrolidone, N-vinyl imidazole, vinyl sulfone, vinyl sulfoxide, etc., may be used. Also, diacrylate dibasic acid, dimethacrylate, and acrylate and methacrylate of their derivative bifuntional monomer, trifunctional monomer, or quadrifunctional monomer may be used. It is preferable that the monomer is a non-liquid crystal compound which can be completely separated from liquid crystal at normal temperature.

In the prior art method for forming networks, it has been general that monomer is made into macromolecules at once by irradiating a radiation ray such as ultraviolet rays in a dissolved state. Therefore, very minute polymer networks whose size is 1 through 3 microns are formed. The inventor et al., succeeded in forming networks whose size is large, by causing phase separation by slowly cooling from a state where monomer and liquid crystal are dissolved by heating. It was also confirmed that the size of the networks depends on the cooling speed. If the cooling speed is too slow, the liquid crystal becomes aggregate, and large polymer networks (domains) are formed. If the cooling speed is too fast, the liquid crystal is not sufficiently aggregated, wherein small networks are formed.

After the phase separation between the monomer and liquid crystal is sufficiently completed, they are thermally hardened or completely made into macromolecules by irradiation of radiation rays such as ultraviolet rays. If they are heated or irradiated by radiation rays when the phase separation is insufficient, there is a possibility that the monomer remaining in liquid crystal forms minute networks. Therefore, it is important that the phase separation between the monomer and liquid crystal is sufficiently carried out. In this viewpoint, liquid crystal and monomer which have inferior solubility at normal temperature must be selected.

Although there is no clear definition with respect to the solubility between liquid crystal and monomer, the phase separation temperature between liquid crystal and monomer may be used as one of the indexes. As the temperature of liquid crystal is raised, a nematic liquid crystal layer is turned into an isotropic liquid layer, wherein the phase change temperature is called a phase transfer temperature (NI point). At a higher temperature than the NI point, monomer is likely to be solved with liquid crystal. However, as the temperature is gradually lowered, phase separation occurs between the liquid crystal and monomer. The better the solubility of monomer becomes, the more the phase separation temperature becomes lower than the NI point. Therefore, it can be said that the smaller the difference between the NI point and the phase separation temperature becomes, the more inferior the solubility becomes.

Also, the higher the phase separation temperature becomes, the worse the solubility becomes at room temperature. However, this is applicable to the case of non-liquid crystal monomer. In the case of liquid crystal monomer, the solubility is roughly good.

In addition, since the monomer used in the invention, whose solubility with liquid crystal is not good at normal temperature, is used, it is hard to elute the non-reacted monomer resultantly obtained in the liquid crystal display into liquid crystal, whereby it is possible to obtain a liquid crystal display having high reliability with respect to display performance (the reliability means a long-term stability of display performance in an environment when used, such as in particular, heat resistance, high temperature resistance, humidity resistance, etc.,)

The speed of cooling down from a state, where monomer and liquid crystal are made soluble with each other by heating, to a temperature, at which phase separation occurs, or room temperature is 0.5° C. through 10° C. per minute, preferably, 10° C. per minute. Also, it is confirmed by an optical microscope that the phase separation is completed, and the time when no change occurs in the networks is regarded as the time of completion of phase separation.

Monomer used in the invention is used and blended with liquid crystal at a ratio of 0.1 through 20% by weight. In order to form polymer networks so that a liquid crystal layer which is divided into comparatively large areas whose minimum diameter measured by vernier calipers is 5 $\mu$m and maximum diameter thereof is 100 $\mu$m, it is important that monomer having inferior solubility with liquid crystal is selected. In order to form large networks as described above, it is necessary to adjust the mixture of liquid crystal and monomer, whose solubility is inferior. From this point of view, the invention greatly differs from the invention, in which easily soluble PSCT monomer was used as disclosed in the prior art, made by Kent, et al.

Further, as a chiral agent, Melc Corporation's brand names C15, ER-M, CB15, CM-22, CM-32, CM-34, CN, CM-21, CM-31, CM-33, CM-43L, S1011, R1011, S811, R811, and Asahi Denka's brand names CNL-611, CNL-617, etc., may be used. The chiral agent is doped so that the reflection wavelength of obtained liquid crystal display is in a range from 400 through 700 nm, depending on the types thereof.

If a polymerization initiator of monomer is needed, it may be used. As a polymerization initiator, benzoilehtylether, 2-hydroxy-2-methyl-1-phenylpropane-1-on, 1-hydroxycyclo-hexylphenylketone, 2-methyl-1-(4-methylthio)phenyl)-2-morpholinopropanon-1, bisacylphosphine oxide, etc., may be listed. One of these optical polymerization initiators or its combination may be used.

Monomer is made into macromolecules by irradiating radiation rays such as ultraviolet rays, electron rays, y rays, etc., at normal temperature. For example, using ultraviolet rays, a lamp of 40 W through 160 W is used, and irradiation is carried out for 30 seconds through 120 seconds.

Since a liquid crystal layer, which is divided into comparatively large areas whose minimum diameter measured by vernier calipers is 5 $\mu$pm and maximum diameter measured by vernier calipers is 100 $\mu$m, is formed by polymer networks obtained by monomer whose solubility with liquid crystal is inferior at normal temperature, the PSCT has a high reflective index, and a liquid crystal display having an excellent quality of less visual angle dependency can be obtained. Furthermore, the liquid crystal display has a sufficient shock resistance properties, wherein it was confirmed that the reliability with respect to the display performance is high.

In particular, if the sectional shape of liquid crystal surrounded by the polymer networks is polygonal, generation of lump-like polymer networks, which do not contribute to display, is suppressed, the area occupied by liquid crystal contributing to the display is not decreased. Therefore, the display quality of a liquid crystal display which will be obtained can be improved.

BEST MODE FOR CARRYING OUT THE INVENTION

A description is given of an embodiment of the invention.

Embodiment 1

Brand name CB15 (Merk Corporation's 3-(2-methyl) propyl-3'-cyano-1-1'-biphenyl) is doped, at a ratio of 38% by weight, to Brand name Mixture PNM108 (Dai-Nippon Ink, Inc.) in which diacryl monomer is mixed with nematic liquid crystal at a ratio of 20% by weight, and they are heated to 90° C., the sufficiently blended mixture is poured, in an atmosphere of 90° C., between two ITO (Indium Tin Oxide) 2a and 2b, and glass substrates 3a and 3b (See FIG. 1), which are spaced by spacers at intervals of 6.7pm. As the mixture is gradually cooled down to room temperature for 15 minutes after the mixture is poured, phase separation occurs between a liquid crystal layer and a monomer layer. After it is confirmed by an optical microscope that the phase separation has been sufficiently completed, it is optically hardened by irradiating a 80 W high voltage mercury lamp for one minute.

Observing the thus obtained liquid crystal display by using an optical microscope, the network structure shaped as shown in FIG. 2(a) was observed. The diameter of respective twenty liquid crystal cells therein measured by vernier calipers was in a range from 5 through 50$\mu$m as the minimum diameter, and was in a range from 10 through 100 $\mu$m as the maximum diameter.

The optical dispersion is suppressed by the network structure of the obtained liquid crystal display, and the reflective index was 30% or so. No chromatic change occurred when diagonally observed the liquid crystal display. Also, with respect to the reflective index, an Ohtsuka Denshi's LCD-7000 was used, wherein light having a wavelength of 580 nm was irradiated on the display in a direction of 25 degrees with respect to the perpendicular line of the liquid crystal display, and a photomul (optical electron multiplier) in the front received the reflected light, wherein the spectral reflective index was measured.

In addition, even though the glass surface is intensively pressed by a finger so that pressure of approx. 10 Kg/cm$^2$ is applied thereto. Satisfactory display could be obtained without being adversely influenced.

Further, where the cooling speed was shortened to 5 minutes after constituents for forming the abovementioned liquid crystal display in an atmosphere of 90° C. were poured, a network structure shaped as shown in FIG. 2(b) was observed. The diameter of respective twenty liquid crystal cells therein measured by vernier calipers was in a range from 10 through 30 μm as the minimum diameter, and was in a range from 15 through 50 μm as the maximum diameter. At this time, it is considered that the particles of the liquid crystal 1 are oriented as shown in FIG. 1.

Embodiment 2

Brand name S101 (Melc Corporation's make) being a chiral agent is doped, at a ratio of 7.0% by weight, to Brand name Mixture PNM108 (Dai-Nippon Ink, Inc.) in which diacryl monomer is mixed with nematic liquid crystal at a ratio of 20% by weight, and they are heated to 90° C. The sufficiently blended mixture is poured, in an atmosphere of 90° C., between two ITO 2a and 2b, and glass substrates 3a and 3b, which are spaced by spacers at intervals of 6.7 μm. As the mixture is gradually cooled down to room temperature for 10 minutes after the mixture is poured, phase separation occurs between a liquid crystal layer and a monomer layer. After the phase separation was sufficiently completed, it was optically hardened by irradiating a 80 W high voltage mercury lamp for one minute.

Observing the thus obtained liquid crystal display by using an optical microscope, a network structure was observed. The diameter of respective twenty liquid crystal cells therein measured by vernier calipers was in a range from 10 through 45 μm as the minimum diameter, and was in a range from 15 through 100 μm as the maximum diameter.

The optical dispersion is suppressed by the network structure of the obtained liquid crystal display, and the reflective index was 30% or so when having measured the reflective index by using light having a wavelength of 580 nm by the method similar to that of the embodiment 1. No chromatic change occurred when diagonally observing the liquid crystal display.

In addition, even though the glass surface is intensively pressed by a finger so that pressure of approx. 10 Kg/cm$^2$ is applied thereto. Satisfactory display could be obtained without being adversely influenced. At this time, it is considered that liquid crystal particles are oriented as shown in FIG. 1.

Comparison example 1

Nematic liquid crystal E44 (Brand name of Melc Corporation's cyanobiphenyl based liquid crystal) of 58.94% by weight, Brand name CB15 (Merk Corporation's make) being a chiral agent at 38% by weight, Brand name SL3435 (Asahi Denka's make) being monomer of 38% by weight, and benzoin methylether of 0.06% by weight are sufficiently blended at 50° C. to produce a uniform mixture. The mixture was poured between two ITO glass substrates spaced by spacers at intervals of 6.7 μm, and was optically hardened by irradiating a 80 W high voltage mercury lamp thereto at 25° C. for one minute.

Figure 6:
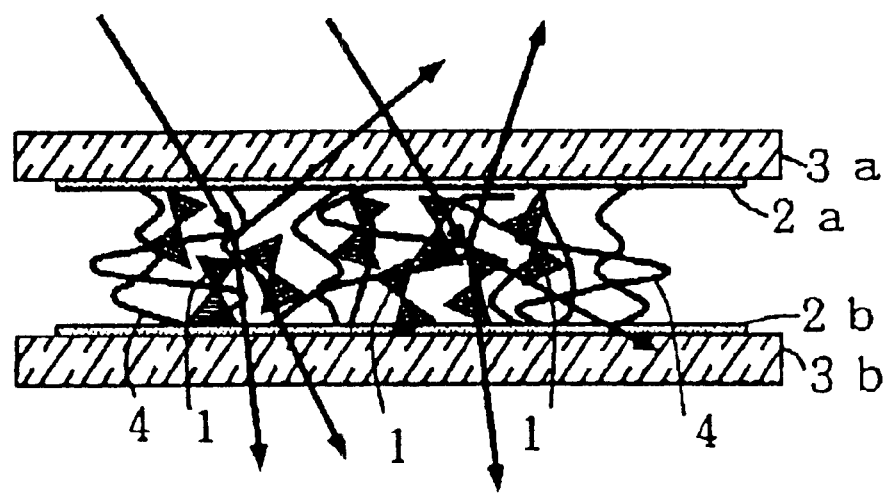
FIG. 6 is a sectional view of orientation simulations of polymer and liquid crystal particles of the PSCT according to the prior art.

Observing the polymer network in the thus obtained liquid crystal display by using an optical microscope, a network structure having a diameter (vernier calipers) of approx. 1 through 3 μm was observed. The liquid crystal was white because the optical dispersion is made great by the networks, and only a reflective index of approx. 20% was obtained. Also, by only slightly pressing the glass surface, the display disappears. At this time, it is considered that liquid crystal particles are oriented as shown in FIG. 6.

Comparison Example 2

Figure 5:
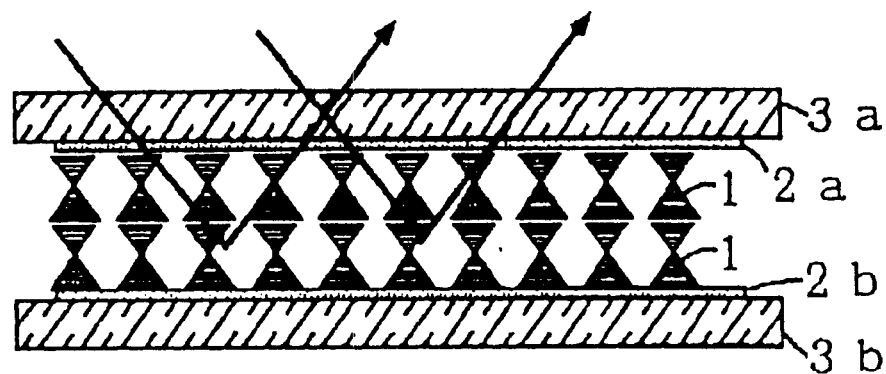
FIG. 5 is a sectional view of orientation simulations of liquid crystal particles not containing polymer.

Nematic liquid E44 (Merk Corporation's make) of 72% by weight, and a chiral agent CB15 (Melc Corporation's make) of 38% by weight are sufficiently blended to produce a uniform mixture. The mixture was poured between two ITO glass substrates which is spaced by spacers at intervals of 6.7 μm. No polymer network is observed in the obtained liquid crystal display because no monomer is doped thereon. Although the reflective index of the liquid crystal display was 35%, the reflection produced glare which is peculiar in the Bragg's reflection, wherein the reflected light changes, that is, green which is observed at the front side is turned into blue when the visual angle is changed. Also, by only slightly pressing the glass surface by a finger, the display completely disappears. At this time, it is considered that the liquid crystal particles are oriented as shown in FIG. 5.

What is claimed is:

1. A liquid crystal display comprising a liquid crystal layer formed between two conductive substrates, wherein at least one of said substrates is transparent, said liquid crystal layer including a network of polymerized monomer walls respectively separating a plurality of liquid crystal portions from one another, wherein each of said liquid crystal portions (i) is formed of a material that is substantially non-soluble with said monomer at normal temperatures (ii) is selected from the group consisting of cholesteric liquid crystal, chiral nematic liquid crystal or a mixture thereof, and (iii) is respectively roughly pillar-like in shape so as to define a cross-section parallel to said substrates that has a polygonal or a closed curve periphery and a minimum cross-sectional dimension measured by vernier calipers of at least about 5 μm and a maximum cross-sectional dimension measured by vernier calipers of not more than about 100 μm, and wherein said liquid crystal layer occupies 90% or more of the entire liquid crystal layer.

2. A liquid crystal display as set forth in claim 1, wherein said walls of said network are roughly uniform in thickness.

3. A liquid crystal display as set forth in claim 1, wherein said monomer in said liquid crystal layer is provided at a ratio of between about 0.1% and 20% by weight of the material contained in said liquid crystal layer.

4. A method for producing a liquid crystal display having a liquid crystal layer formed between two conductive substrates, at least one of which is transparent, characterized in that said liquid crystal layer comprises a plurality of liquid crystal portions formed of a material selected from the group consisting of cholesteric liquid crystal, chiral nematic liquid crystal or a mixture thereof, and in that said liquid crystal portions are respectively surrounded by walls of a network formed of a polymerized monomer that is non-soluble with the material of said liquid crystal portions at normal temperatures, the method comprising the steps of:

heating said liquid crystal material and said monomer so as to dissolve them together;

locating said dissolved together liquid crystal material and monomer between said substrates;

gradually cooling said dissolved together liquid crystal material and monomer so as to effect phase separation between said liquid crystal material and said monomer, and thereafter irradiating said liquid crystal layer by ultraviolet ray or heating so that polymerization of said monomer occurs.

5. A method for producing a liquid crystal display as set forth in claim 4, wherein the speed of cooling said dissolved together liquid crystal material and monomer to normal temperature is controlled such that a predetermined level of phase separation of said monomer from said liquid crystal material is achieved prior to said irradiation or heating for polymerizing said monomer.

* * * * *